United States Patent [19]

Welburn

[11] Patent Number: 4,700,189
[45] Date of Patent: Oct. 13, 1987

[54] LINEAR RESOLVER
[75] Inventor: Ross D. Welburn, Santa Rosa, Calif.
[73] Assignee: Motornetics Corporation, Santa Rosa, Calif.
[21] Appl. No.: 759,604
[22] Filed: Jul. 26, 1985

Related U.S. Application Data

[63] Continuation-in-part of Ser. No. 556,083, Nov. 29, 1983, Pat. No. 4,551,708.
[51] Int. Cl.⁴ ............................................. G08C 19/06
[52] U.S. Cl. ......................... 340/870.35; 340/870.31; 318/661; 310/158; 336/120; 336/123
[58] Field of Search ................... 340/870.35, 870.36, 340/870.31, 347 SY; 318/659–661; 336/120–123; 310/185, 184

[56] References Cited
U.S. PATENT DOCUMENTS 3,810,136  5/1974  Lang et al. ............... 340/870.35
4,455,555  6/1984  Symonds et al. .......... 340/870.35
4,551,708 11/1985  Welburn ................... 340/347 SY
4,618,808 10/1986  Ish-Shalom et al.

Primary Examiner—John W. Caldwell, Sr.
Assistant Examiner—Tyrone Queen
Attorney, Agent, or Firm—Philip M. Shaw, Jr.

[57] ABSTRACT

A linear synchro/resolver comprised of an opposed pair of stator assemblies, each of which has a plurality of corresponding, opposed, toothed pole piece pairs, a toothed slider movably mounted between the opposed sets of pole piece pairs, and wherein the pole piece pairs on each stator assembly are spaced apart along the assembly's length by a non-integral multiple of the pitch of the stator teeth. Separate coils are wound on the stator pole pieces, with the coils of adjacent and opposed pairs of coils being connected together in phases. The inductance of the coils is thus a function of the alignment of the slide teeth with the stator pole piece teeth. A source of alternating current is connected to the phases of coils, the current magnitude flowing through each phase of the coils is detected, and the current magnitude differences between the phases are amplified. The phases of each of these amplified current differences are then compared with the phase of the source signal to produce an output signal which is representative of the position of the slider relative to the pole pieces.

10 Claims, 6 Drawing Figures

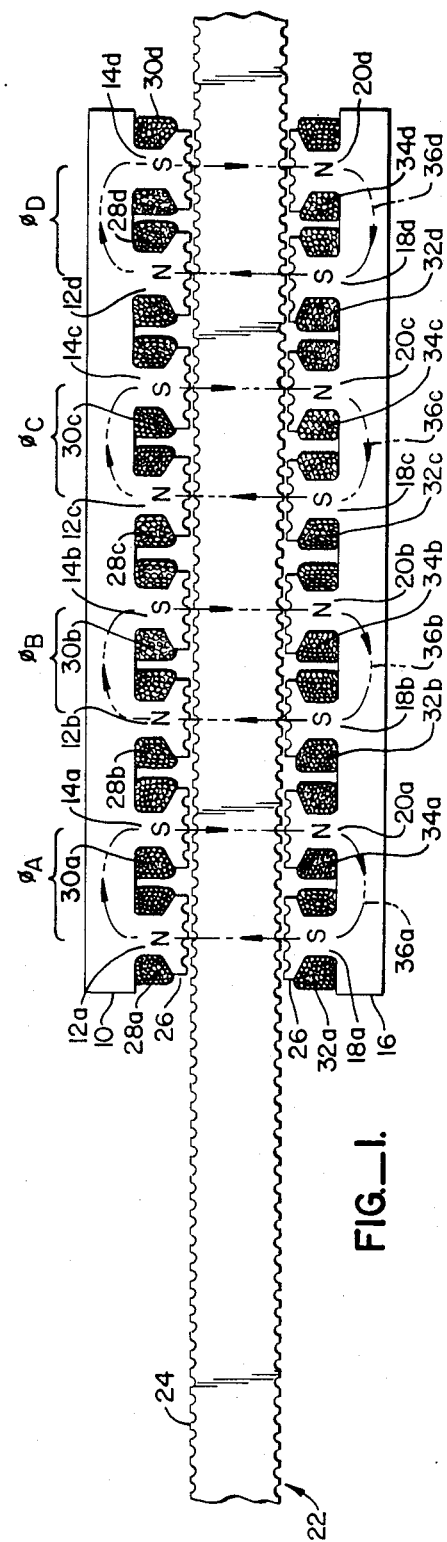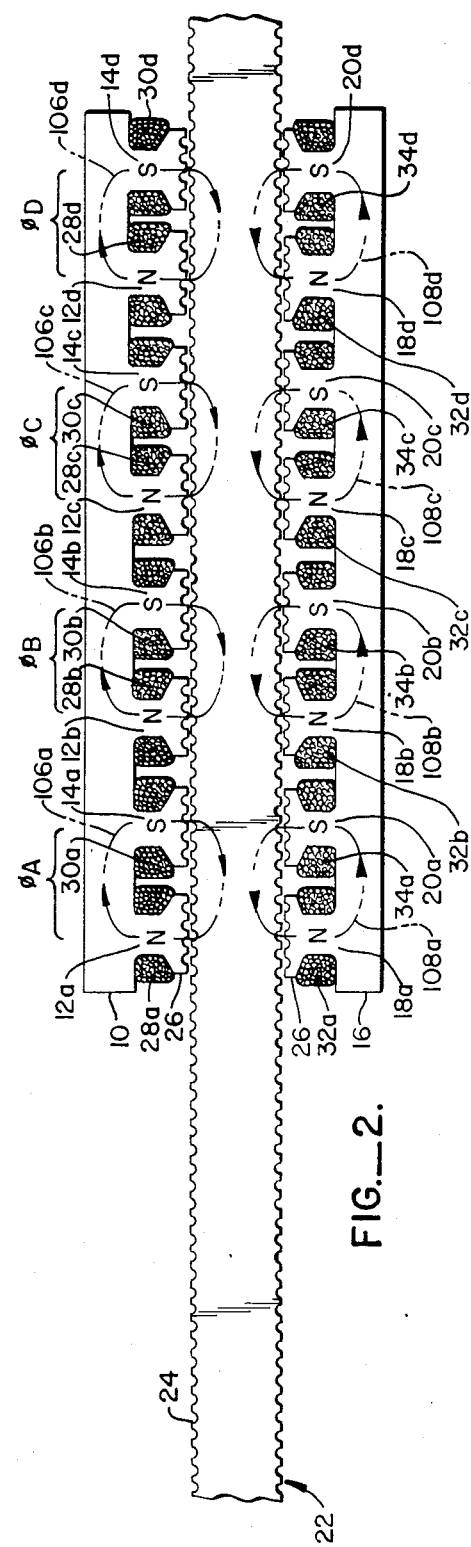
FIG._1.
FIG._2.

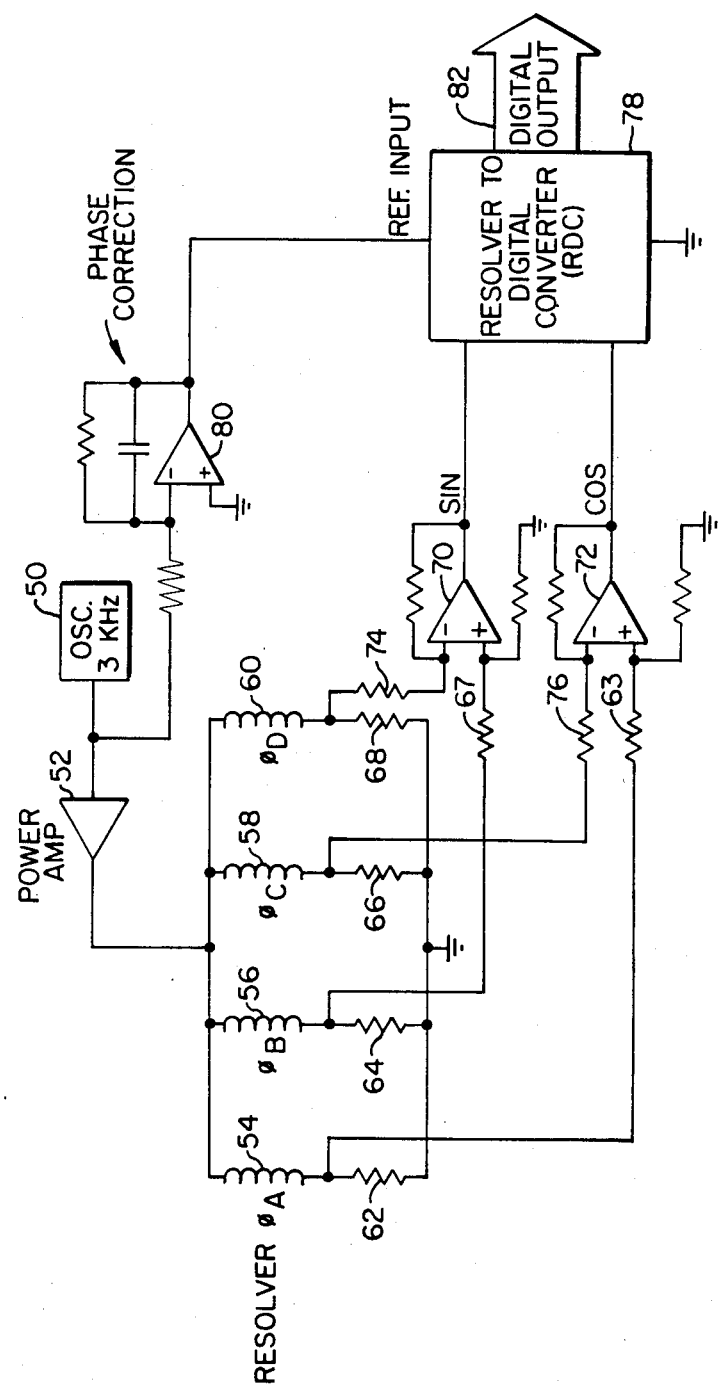
FIG._3.

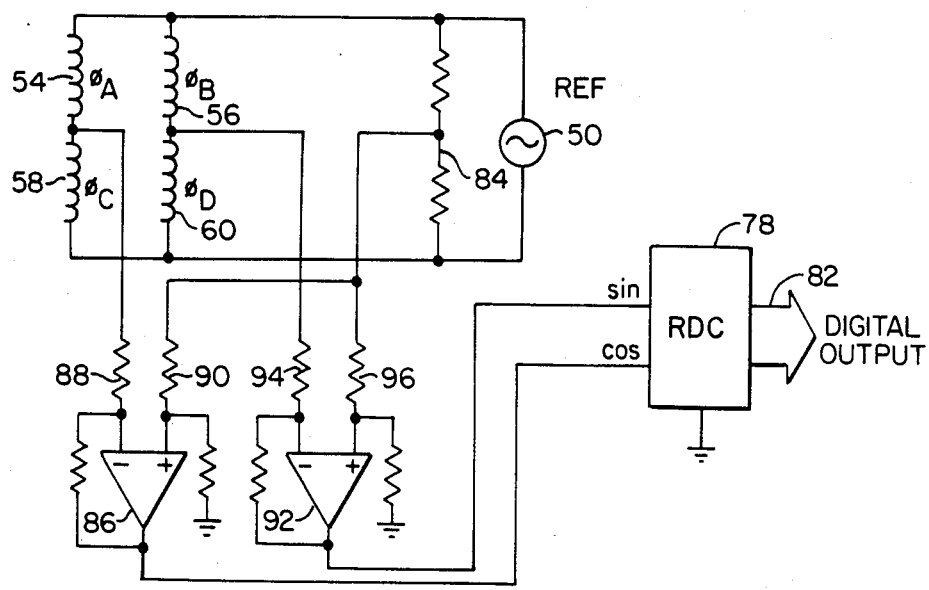
FIG._4.
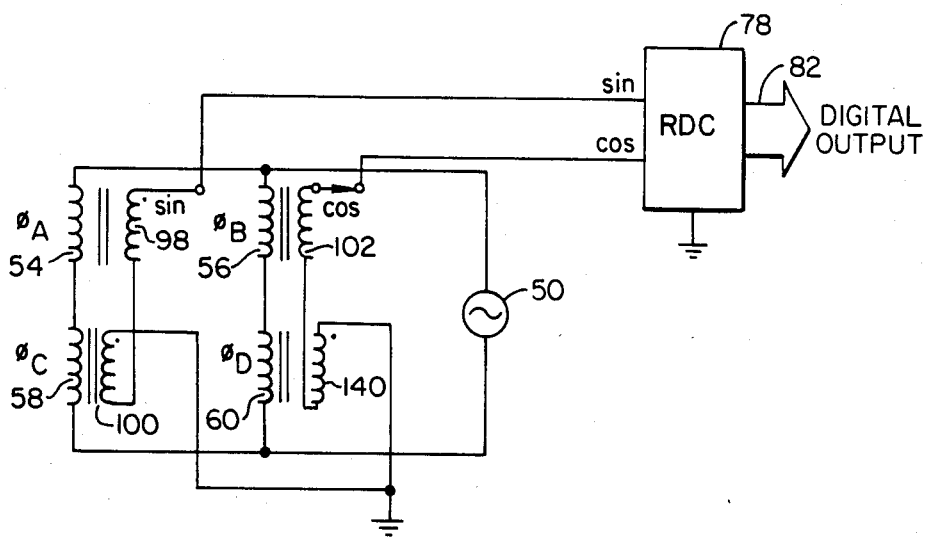
FIG._5.

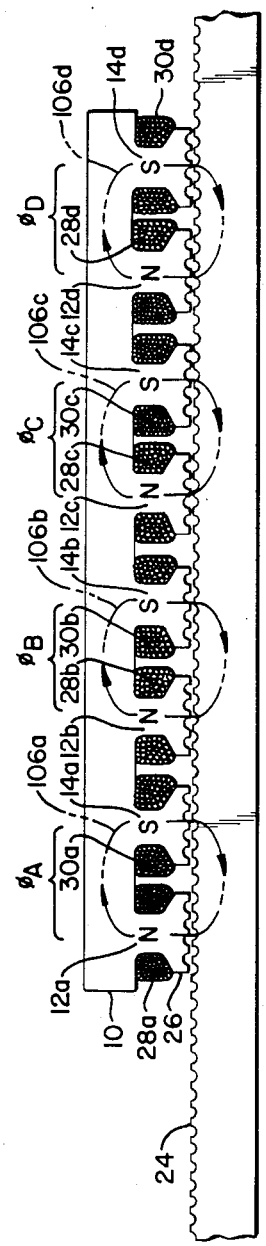

LINEAR RESOLVER

CROSS-REFERENCE TO RELATED APPLICATIONS

This application is a continuation-in-part of the applicant's co-pending application Ser. No. 556,083, filed Nov. 29, 1983, now U.S. Pat. No. 4,551,708 and entitled Reactance Commutated High Resolution Servo Motor System.

DESCRIPTION

1. Technical Field

The present invention relates generally to a resolver and, more particularly, to a linear synchro/resolver for a linear motor.

2. Background Art

Linear motor systems are finding wide applications in robotics type systems and in various other types of servo systems. A servo system using a direct drive motor simplifies the mechanical system by eliminating backlash, increasing reliability, and decreasing maintenance problems caused by gears, belts, and couplings. Many conventional servo motor systems, however, include a number of operating problems as well as unnecessary manufacturing costs and have undesirable weight and space requirements.

At the heart of any servo system is the position sensor which must be coupled to the motor. Typical prior art position sensors in the form of synchro/resolvers require both primary and secondary windings and some have mechanical features, such as slip contacts, which increase maintenance and reliability problems. Also, prior art synchro/resolvers used in servo systems do not have a high enough resolution nor are they as accurate as is often desired in digital direct drive servo positioning systems. In some cases, the output signal of the synchro/resolver encounters interference from the motor windings.

Still another problem of prior art resolver systems is that the commutation of the motor is not proportional. This is to say that the amount of power which must be supplied to the motor as the load increases is not uniform for all positions of the motor shaft or slider. Thus, the requirements of the motor input signal by way of waveform shape, duration, and phase vary depending on the shaft position of the slider of the motor. Prior art resolvers do not provide any compensation for this problem.

DISCLOSURE OF THE INVENTION

The above and other disadvantages of prior art synchro/resolvers for use in servo motor systems are overcome by the present invention of a position sensing device comprised of a pair of opposed, linearly extending stator assemblies, each having a plurality of corresponding pole piece pairs. Each pole piece has a plurality of projecting pole piece teeth, with the pole pairs on each assembly spaced apart by non-integral multiples of the pitch of the pole piece teeth.

Each coil, of a first set of coils, encircles a separate stator pole piece. The coils which are mounted on opposed and adjacent pole pieces of corresponding pairs of pole pieces are connected together to be operable in phases. A linearly extending slider is movably mounted between the opposed stator pole piece pairs and has projecting teeth which are opposed by, and correspond to, the stator pole piece teeth. The slider teeth have the same pitch as the stator pole piece teeth. Thus, the inductance of the stator pole piece coils is a function of the alignment of the slider teeth with the stator pole piece teeth since the relative alignment completes the magnetic flux return path for the coils.

An electrical reference signal source of alternating polarity is connected to the phases of stator coils to produce electrical signals therein. Differential means are employed for detecting the magnitude of the alternating polarity signals flowing through each coil phase and for comparing the phases of the differences between the signal magnitudes in each coil phase with the phase of the source signal. The result of this comparison is used to produce an output signal which is representative of the position of the slider relative to the stator pole pieces.

An important aspect of this synchro/resolver is its self-cancellation properties. That is, since we have two stators symmetrically engaging a slider, we have slider misalignment correction. If the slider is closer to one stator than the other, one inductance increases while the opposite decreases. Since each phase is in series, thus summing the contribution of both inductances, this linear resolver is independent of slider centering on location. The total of both gaps, of course, must be the same (the slider cannot be tapered).

It is therefore an object of the present invention to have an accurate, high resolution, linear synchro/resolver that is simple and that requires minimal maintenance.

It is another object of the invention to provide a synchro/resolver for controlling proportional commutation of a servo motor.

It is yet a further object of the invention to provide a linear synchro/resolver which is made of identical parts as the linear motor which drives it.

The foregoing and other advantages of the present invention will become apparent to those skilled in the art after having read the following best mode for carrying out the invention, together with the drawings.

BRIEF DESCRIPTION OF THE DRAWINGS

FIG. 1 is a vertical, sectional view of a synchro/resolver according to a first embodiment of the invention;

FIG. 2 is a vertical, section view of the synchro/resolver according to a second embodiment of the invention;

FIGS. 3, 4, and 5 are schematic diagrams of alternative embodiments of synchro/resolver detecting circuits; and FIG. 6 is a vertical, section view of the synchro/resolver according to a third embodiment of the invention.

BEST MODE FOR CARRYING OUT THE INVENTION

Referring now more particularly to FIG. 1 of the drawings, a synchro/resolver according to a first embodiment of the invention is depicted. It is comprised of a first stator assembly 10 and a second stator assembly 16. Each stator assembly is made up of a plurality of stator pole pieces grouped together in pairs which, as will be explained further hereinafter, represent phases A, B, C, and D. The corresponding poles of the stator assembly 10 oppose those of the stator assembly 16. Thus, the stator assembly 10 has a first pair of poles 12a and 14a, each of which has a plurality of stator pole piece teeth 26 at their extreme ends. The pole pieces 12a and 14a are spaced apart from each other by an integral multiple of the pitch of the teeth 26.

Opposed to the stator poles 12a and 14a are a pair of corresponding stator poles 18a and 20a extending from the stator assembly 16. The pole pieces 18a and 20a likewise have extending stator teeth 26 at their extreme ends and are spaced apart by an integral multiple of the pitch of the stator teeth 26. The assemblies 10 and 16 are arranged such that the corresponding stator teeth 26 of the opposed pairs of pole pieces 12a, 14a, 18a, and 20a are aligned.

Interposed between the stator assemblies 10 and 16 is a slider 22 which has projecting teeth 24 on both sides of it which have the same pitch as the stator teeth 26. The slider 22 is movably mounted to slide longitudinally, that is from left to right in the figure, between the stator assemblies 10 and 16 and is spaced slightly from the stator pole pieces 12a, 14a, 18a, and 20a. Thus, with the correct positioning of the slider 22, the teeth 24 of the slider on both sides can be fully aligned with the teeth 26 of the stator pole pieces 12a–20a, inclusive.

Separate coils 28a, 30a, 32a, and 34a encircle each of the pole pieces 12a, 14a, 18a, and 20a, respectively. These coils are connected and wound such that, when energized, the coil 28a is opposite in magnetic polarity to the coils 30a and 32a and is of the same polarity as the coil 34a.

As will be described in greater detail hereinafter, a reference source signal is used to energize the coils by phases. When this happens, a magnetic flux path 36a is established which flows from the stator pole 12a, through the stator assembly 10, to the stator pole 14a, across the gap between the slider 22 and the stator pole 14a, through the slider 22, across the gap to the stator pole 20a, through the stator assembly 16 and the stator pole 32a to cross the gaps and the slider 22 to return to the stator pole 12a.

So far, only a single phase of a synchro/resolver has been described. Each of the stator assemblies 10 and 16 also has similarly arranged stator pole piece pairs corresponding to phases B, C, and D. Thus, stator assembly 10 has a pair of pole pieces 12b and 14b which are, respectively, surrounded by coils 28b and 30b. This pair of stator pole pieces is opposed by a corresponding pair of stator pole pieces 18b and 20b on stator assembly 16. The pole pieces 18b and 20b are encircled by coils 32b and 34b, respectively. The spacing between the poles 28b and 30b and between the poles 32b and 34b are integral multiples of the pitch of the stator teeth 26 and the slider teeth 22. However, the spacings between the poles 14a and 12b and between 20a and 18b are non-integral multiples of the pitch of the stator slider teeth. In fact, the spacing is an integral multiple of the tooth pitch plus one quarter of a tooth pitch.

Since the arrangements of coils and poles for the remaining phases C and D are substantially identical to those for phases A and B, they will not be discussed in detail. They have been assigned the same reference numerals with the letters c or d corresponding to phases C or D, respectively. The spacing between the pole pairs of one phase and those of the next adjacent phase is, in each case, an integral multiple of the pitch of the stator and slider teeth plus one quarter tooth pitch going from one phase to the next.

Thus, as shown in FIG. 1, the slider teeth 24 are fully aligned with the teeth 26 of the stator poles 12c, 14c, 18c, and 20c. As can also be seen, the alignment of the slider teeth 24 with the stator teeth 26 on the stator pole piece 14b is one quarter tooth pitch less than full alignment. Similarly, the alignment between the slider teeth 24 and the stator pole piece teeth 26 on the stator pole 14a is one half tooth pitch away from alignment. The non-alignment between the slider teeth 24 and the stator pole piece teeth 26 for the stator pole 12d is one quarter tooth pitch ahead of the full alignment. This will produce magnitude phase differences in the stator coils, with respect to phase C, of −90° for phase B, 180° for phase A, and +90° for phase D.

Referring now more particularly to FIG. 3, the apparatus and method for detecting the various misalignments of the slider and stator teeth by phase is disclosed. A reference signal source 50, in this case a 3000 Hertz oscillator, produces an alternating current signal which is amplified by a power amplifier 52 and is supplied to all of the coils with the phases connected in parallel. Thus, the coil 54 shown in FIG. 3 represents the coils 28a, 30a, 32a, and 34a connected and wound to have the polarities shown in FIG. 1 and to be electrically connected in series. The coils 56, 58, and 60, shown in FIG. 3 likewise, represent the stator pole piece coils corresponding to the phases B, C, and D shown in FIG. 1, respectively. The coils 54, 56, 58, and 60 are connected through, respectively, resistors 62, 64, 66, and 68 to the circuit ground.

The junction of the coil 54 and the resistor 62 is connected through a resistor 63 to the non-inverting input of a differential amplifier 72. The junction between the coil 56 and the resistor 64 is connected through a resistor 67 to the non-inverting input of a differential amplifier 70. The junction point between the coil 58 and the resistor 66 is connected through a resistor 76 to the inverting input of the amplifier 72. Similarly, the junction point between the coil 60 and the resistor 68 is connected through a resistor 74 to the inverting input of the differential amplifier 70.

Above mentioned above, when the magnetic teeth of the slider and the stator pole pairs are aligned, the inductance, and hence the impedance, of the energized pole piece windings is higher than when the teeth are misaligned. This variation in impedance can be detected by the detecting variations of the alternating current magnitude when the coils are connected to an alternating current constant voltage source such as the source 50. The coil current develops a representative voltage drop across each current sensing resistor 62–68.

Each of these current magnitude differences between the coils of each phase have a position phase of their own. Because the phases A to C and B to D will always be 180° different in alignment, the phases of the differences between their coil current magnitudes represent cosine and sine functions, respectively, of the slider's position relative to the stator assemblies. The outputs of the amplifiers 70 and 72 thus represent these sine and cosine functions. These outputs are supplied as separate inputs to a resolver-to-digital converter module 78. The reference source 50 is connected to supply a reference input. Such devices are well-known in the art and are commercially available. One such device is a model XDC19109-301 available from ILC Data Device Corporation, 105 Wilbur Place, Bohemia, N.Y. 11716. This device produces a digital resolver position signal as its output 82 which can be used to commutate a linear motor constructed substantially identical to the resolver shown in FIG. 1 except that, in this case, current is sequentially supplied to each of the coil phases to drive the slider 22 linearly with respect to the stator assemblies 10 and 16.

Because current is being sensed by the differential amplifiers 70 and 72, there is an induced phase shift of 90° from the driving voltage. This requires the introduction of a phase shift circuit between the oscillator 50 and the reference input of the resolver-to-digital converter ("RDC") module 78. The phase shifter 80 produces a 90° lag in the phase from the reference source 50.

Referring now more particularly to FIG. 4, still another embodiment of the detecting means is depicted. In this embodiment, the differential amplifiers sense and amplify the differences between the voltages of the various phases and the resolver-to-digital converter ("RDC") module 78 compare the phases of these differences with the phase of the reference signal in order to produce the position signal.

Alternating polarity signal source 50 has its outputs connected across a voltage divider circuit 84 which is ½ of a double bridge circuit. The outputs of the source 50 are also connected across a series connection of the coils 54 of phase A an the coils 58 of phase C, the second half of the bridge. Similarly, the output of the reference source 50 is also connected across the series connection of the coils 56 of phase B and the coils 60 of phase D, the second half of a second bridge. The connection point between the coils 54 and 58 is connected through a resistor 88 to the inverting input of a differential amplifier 86. The center tap of the voltage divider 84 is connected through a resistor 90 to the non-inverting input of the amplifier 86. The connection point between the coils 56 and 60 is connected through a resistor 94 to the inverting input of the differential amplifier 92 and the center tap of the voltage divider 84 is connected through a resistance 96 to the non-inverting input of the differential amplifier 92. The output of the amplifier 86 corresponds to a cosine function and the output of the amplifier 92 corresponds to a sine function with respect to the detected phase differences which are indicative of the position of the slider relative to the stator assemblies. These two outputs are input to the RDC module 78 which outputs a digital resolver position signal 82.

Referring now to FIG. 5, still another embodiment for detection of the phase differences is disclosed. As in the embodiment of FIG. 6, the coils 54 of phase A and the coils 58 of phase C are connected in series across the output of the source 50. The coils 56 of phase B and the coils 60 of phase D are also connected in series across the output of the source 50.

In order to detect the phase differences, secondary windings are wrapped about the stator pole piece coils and are connected together to produce a differential sensing circuit. Thus, coil 98 represents a series connection of stator pole piece coils wrapped on top of (or underneath) the coils 28a, 30a, 32a, and 34a of phase A. Note that the secondary coils 98 are wrapped with a designated direction. A second set of coils 100 are similarly wrapped around (or underneath) the coils 28c, 30c, 32c, and 34c of phase C, represented cumulatively by the coil 58 in FIG. 5, and are connected in series with the secondary coils 98. It will be noted, however, that the coils 100 are connected in phase opposition to the coils 98 (or they could be oppositely wound on the stator pole pieces from the direction used in wrapping the secondary coils 98). The coils 98 and 100, as connected in series and in phase opposition, are connected between the circuit ground and the sine function input to the resolver-to-digital converter module 78.

Similarly, secondary coils 102 are wrapped around or underneath the stator pole piece coils of phase B as represented by the coil 56 in FIG. 5 and the secondary coils 104 are wrapped about (or underneath) the stator pole piece coils of phase D, as represented by the coil 60 in FIG. 5. The secondary coils 102 and 104 are connected in series opposition between the circuit ground and the cosine input to the RDC module 78.

Again, the operation of the detecting circuit shown in FIG. 5 is the same as those of FIGS. 3 and 4, namely, the phases of the differences between the signal magnitudes flowing in the various phases are compared to the phase of the reference signal source 50, and the result of this comparison is used by the RDC module 78 to produce a digital synchro position signal 82.

Referring now more particularly to FIG. 2, another embodiment of the synchro/resolver is depicted. This embodiment is constructed substantially the same as that depicted in FIG. 1, except that the coils for a pole pair of a given phase are connected only to each other and not to the coils of the pole pair on the opposite stator assembly. Thus, with respect to phase A, for example, the coils 28a and 30a are connected in series and are either wound or connected so as to have opposite magnetic polarities when energized.

Similarly, the coils 32a and 34a on the opposed pole pieces 18a and 20a are connected in series to have opposing magnetic polarities. They are also arranged to have opposing magnetic polarities to the corresponding, opposite poles 12a and 14a. Thus, the coil 32a has a north magnetic polarity which opposes the north magnetic polarity of the coil 28a. The coil 30a has a south polarity which opposes the south polarity of the coil 34a. In this way, when the coils 28a–34a, inclusive, are energized by the reference signal source 50, separate flux paths 106a and 108a will be generated. The flux path 106a passes through the stator pole piece 12a, through the stator assembly 10, through the stator pole piece 14a, and lengthwise through a portion of the slider 22 to return to the pole piece 12a. Flux path 108a follows a similar path with respect to the stator pole pieces 18a, 20a, and the slider 22.

It should be noted that while a four phase resolver is illustrated the teachings of the invention are application to embodiments having a different number of phases. It is the reluctance resolver in conjunction with the differential phase comparison that is important in this invention. The differential phase comparison cancels out the common mode impedance and converts from multiphase unipolar signals to multi-phase bipolar signals. Multi-phase to two phase converters are shown for example only.

Also, although two stator assemblies are shown in most embodiments, the resolver of the invention can have only a single stator assembly, as shown in FIG. 6. It requires more stringent mechanical alignment than the other embodiments discussed above but otherwise operates in the substantially same manner as the embodiment depicted in FIG. 2.

The arrangement of the coils and flux paths in the remaining phase is substantially the same and corresponding reference numerals have therefore been applied.

This linear resolver will work for three or more phases. It cannot have a negative impedance when the teeth are misaligned, only a positive impedance with the teeth aligned. Another phase is used, preferably 180° out of phase, to give the negative polarity.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A position sensing device comprised of a pair of opposed, linearly extending stator assemblies each having a plurality of corresponding pairs of adjacent pole pieces, with the corresponding pole piece pairs of one stator assembly being aligned with, and opposed to those of the other stator assembly, each pole piece having a plurality of corresponding pole piece teeth, with the pole pieces of each pair being spaced apart from each other along the length of each stator assembly by an integral multiple of the pitch of the stator teeth and the pole piece pairs of each stator assembly being spaced apart from adjacent pole piece pairs along the length of the stator assembly by a non-integral multiple of the pitch of the pole piece teeth,
   a first set of coils, each coil encircling a separate stator pole piece, the coils which are mounted on opposed and adjacent pole pieces of corresponding opposed pairs of pole pieces being connected together to be operable in phases,
   a linearly extending slider movably mounted between the opposed stator pole pieces, the slider having projecting teeth opposed and corresponding to the stator pole piece teeth and having the same pitch, whereby the inductance of the stator pole piece coils is a function of the alignment of the slider teeth with the stator pole piece teeth,
   detecting means comprising an electrical reference signal source of alternating polarity connected to the phases of stator coils, differential means for detecting the magnitude of the alternating polarity signal flowing through each phase of the coils and for comparing the phases of the signal magnitude differences between each coil phase with the phase of the source signal to produce an output signal which is representative of the position of the slider relative to the stator pole pieces.

2. A position sensing device as recited in claim 1 wherein the coils of adjacent pole pieces of the same phase are wound and connected to have an opposite magnetic polarity.

3. A position sensing device as recited in claim 2 wherein the coils of opposed pole pieces of the same phase are wound and connected to have an opposite magnetic polarity.

4. A position sensing device as recited in claim 2 wherein the coils of opposed pole pieces of the same phase are wound and connected to have the same magnetic polarity.

5. A position sensing device as recited in claim 1 wherein the reference signal source supplies an alternating current signal to the coils and the differential means detects and amplifies electrical current magnitudes.

6. A position sensing device as recited in claim 1 wherein the detecting means detects and amplifies voltage magnitudes.

7. A position sensing device as recited in claim 1 wherein the number of phases of coil connections is four and further comprising a resolver-to-digital converter means for converting sine and cosine function input signals into digital position signals, a circuit ground, a second set of coils, each coil being wound in a magnetically coupled relationship with a separate coil of the first set, with the coils of the second set being connected together in phases corresponding to those of the first set of coils and further wherein the second set of coils of the first and third phases are connected in series opposition between the circuit ground and the sine function input of the resolver-to-digital converter means, and the second set of coils of the second and fourth phases are connected in series opposition at one end between the circuit ground and the cosine function input of the resolver-to-digital converter means.

8. A method of determining the position of a toothed slider relative to a pair of opposed stator assemblies which straddle the slider, the stator assemblies having a plurality of corresponding opposed pairs of toothed pole pieces, which pairs are separated by a non-integral multiple of the pitch of the slider teeth and with separate coils encircling each pole of the pairs of pole pieces, the coils being connected in separate phases corresponding to the different pairs of pole pieces, wherein the method comprises the steps of
   applying a reference electrical signal of alternating polarity to the coil phases,
   detecting the magnitudes of the resultant signals flowing through each phase of the coils,
   comparing the phases of the signal magnitude differences between each coil phase with the phase of the source signal, and from this comparison,
   producing a signal which is representative of the position of the slider relative to the stator pole pieces.

9. A position sensing device comprised of:
   a linearly extending stator assembly having a plurality of corresponding pairs of adjacent pole pieces, each pole piece having a plurality of corresponding pole piece teeth, with the pole pieces of each pair being spaced apart from each other along the length of each stator assembly by an integral multiple of the pitch of the stator teeth and the pole piece pairs of each stator assembly being spaced apart from adjacent pole piece pairs along the length of the stator assembly by a non-integral multiple of the pitch of the pole piece teeth,
   a plurality of coils, each coil encircling a separate stator pole piece, the coils which are mounted on adjacent pole pieces of a pair of pole pieces being connected together to be operable in phases,
   a linearly extending slider movably mounted adjacent the stator pole pieces, the slider having projecting teeth opposed and corresponding to the stator pole piece teeth and having the same pitch, whereby the inductance of the stator pole piece coils is a function of the alignment of the slider teeth with the stator pole piece teeth,
   detecting means comprising an electrical reference signal source of alternating polarity connected to the phases of stator coils, differential means for detecting the magnitude of the alternating polarity signal flowing through each phase of the coils and for comparing the phases of the signal magnitude differences between each coil phase with the phase of the source signal to produce an output signal which is representative of the position of the slider relative to the stator pole pieces.

10. A position sensing device comprised of a pair of opposed stator assemblies each having a plurality of pole pieces, with the corresponding pole pieces of one stator assembly being aligned with, and opposed to those of the other stator assembly, each pole piece having a plurality of corresponding pole piece teeth, with certain ones of the pole pieces of each stator assembly being spaced apart along the length of the stator assembly by a non-integral multiple of the pitch of the pole piece teeth,

- a first set of coils, each coil encircling a separate stator pole piece, the coils which are mounted on opposed pole pieces being connected together to be operable in phases,
- a movable member mounted between the opposed stator pole pieces, the movable member having projecting teeth opposed and corresponding to the stator pole piece teeth and having the same pitch, whereby the inductance of the stator pole piece coils is a function of the alignment of the movable member teeth with the stator pole piece teeth,
- detecting means comprising an electrical reference signal source of alternating polarity connected to the phases of stator coils, differential means for detecting the magnitude of the alternating polarity signal flowing through each phase of the coils and for comparing the phases of the signal magnitude differences between each coil phase with the phase of the source signal to produce an output signal which is representative of the position of the movable member relative to the stator pole pieces.

* * * * *